United States Patent [19]

Matsufuji et al.

[11] 4,411,956

[45] Oct. 25, 1983

[54] MAGNETIC RECORDING MEDIUM

[75] Inventors: Akihiro Matsufuji; Akira Kasuga; Hajime Miyatsuka, all of Odawara, Japan

[73] Assignee: Fuji Photo Film Co., Ltd., Kanagawa, Japan

[21] Appl. No.: 347,810

[22] Filed: Feb. 11, 1982

[30] Foreign Application Priority Data

Feb. 13, 1981 [JP] Japan .................................. 56-19904

[51] Int. Cl.³ .............................................. H01F 10/02
[52] U.S. Cl. .................................. 428/425.9; 428/457; 428/532; 428/694; 428/900
[58] Field of Search ................................ 427/127–132, 427/48; 252/62.54; 428/900, 694, 425.9, 532, 457

[56] References Cited

U.S. PATENT DOCUMENTS 4,234,438 11/1980 Horigome et al. ............. 427/128 X
4,328,282 5/1982 Lehner et al. .................. 427/128 X

*Primary Examiner*—Bernard D. Pianalto
*Attorney, Agent, or Firm*—Sughrue, Mion, Zinn, Macpeak and Seas

[57] ABSTRACT

A magnetic recording medium having a non-magnetic base overlaid with a magnetic layer containing ferromagnetic particles is disclosed. The ferromagnetic particles are metal particles and the binder is composed of (a) a nitrocellulose and (b) a polyurethane resin.

11 Claims, No Drawings

MAGNETIC RECORDING MEDIUM

FIELD OF THE INVENTION

This invention relates to a magnetic recording medium, and more particularly, to the composition of a binder effective for use in combination with ferromagnetic metal particles. Still more particularly, the invention relates to a magnetic recording medium having an improved dispersion of ferromagnetic metal particles and hence good operating characteristics.

BACKGROUND OF THE INVENTION

A magnetic recording medium basically consists of a non-magnetic base made of a material such as a polyester film, and an overlying magnetic layer principally made of ferromagnetic particles and a binder. Today, ferromagnetic metal particles having high saturation magnetization and coercive force are used for the purpose of providing increased magnetic recording density and reproduction output. Ferromagnetic metal particles have good magnetic properties, but because of their high saturation magnetization ($\sigma s$), the interaction between the individual particles is great, a dispersion of the particles is not easily formed, and a dispersion once formed does not remain stable for a sufficient period of time. For a magnetic layer containing ferromagnetic metal particles, improvement in the recording density is given to the top priority, so the need for shorter recording wavelength and smaller loss in spacing with the head unavoidably requires a smoother tape surface than that of a magnetic layer containing oxide magnetic particles. However, as the tape surface is made smoother, the area of contact with the tape transport system increases and hence the friction coefficient is increased, whereas the durability of the tape is decreased. Because of these disadvantages, the magnetic recording medium obtained often has poor magnetic properties and electro-to-magnetic conversion characteristics, as well as poor running property and low durability.

Conventionally known vinyl chloride/vinyl acetate resins, polyurethane resin, polyester resins and mixtures thereof form a good dispersion of magnetic particles and can be stored for an extended period, but they do not always have satisfactory running property and durability.

SUMMARY OF THE INVENTION

Therefore, one object of this invention is to provide a novel magnetic recording medium.

Another object of the invention is to provide a magnetic recording medium having good magnetic properties.

A further object of the invention is to provide a magnetic recording medium having good running property.

A still further object of the invention is to provide a magnetic recording medium having great durability.

Still another object of the invention is to provide a magnetic recording medium whose characteristics are not greatly changed with time.

The present inventors made various studies to obtain a magnetic recording medium that used ferromagnetic metal particles and which had good magnetic properties, electro-to-magnetic conversion properties, running property and high wear resistance, and have found that the desired magnetic recording medium can be produced by using a binder comprised of (a) a nitrocellulose and (b) a polyurethane resin and optionally (c) a polyisocyanate compound. Therefore, this invention provides a magnetic recording medium having a non-magnetic base overlaid with a magnetic layer comprising ferromagnetic particles and a binder, said ferromagnetic particles being primarily metal particles and said binder being comprised of (a) a nitrocellulose and (b) a polyurethane resin.

DETAILED DESCRIPTION OF THE INVENTION

The nitrocellulose used in this invention is commercial nitrocelluloses for lacquer and derivatives thereof, specifically SS type with a nitrogen content of 10.7 to 11.5% and RS type with a nitrogen content of 11.5 to 12.2%. RS type 1/16 to 120 is preferred, and RS type ¼ to 1 is particularly preferred. These nitrocellulose are described in detail in K. Fabel, *Nitrocellulose Herstellung und Eigenschaften*, Ferdinand Enke Verlog, Stuttgart (1950), F. D. Miles, *Cellulose Nitrate, The Physical Chemistry of Nitrocellulose, Its Formation and Use*, Oliver and Void, London (1955), and H. Maruzawa and K. Uda, *Plastic Zairyo Koza* [17] *Senisokei Jushi* (*Cellulosic Resins*), Nikkan Kogyo Shinbunsha (1970).

Examples of the polyurethane resin used in this invention include polyester polyurethane resins produced by the reaction of polyester polyols or lactone polyester polyols produced from lactones (e.g., ε-caprolactone and γ-butyrolactone) with diisocyanate compounds, and polyether polyurethane resins produced by the reaction of polyether polyols derived from ethylene oxide, propylene oxide or butylene oxide with diisocyanate compounds. The polyester polyols are produced by reating organic dibasic acids such as saturated or unsaturated dicarboxylic acids (e.g., maleic acid and adipic acid), alicyclic dicarboxylic acids (e.g., norbornene dicarboxylic acid) or aromatic dicarboxylic acids (e.g., phthalic acid) with one or more polyols selected from glycols (e.g., ethylene glycol, propylene glycol, diethylene glycol and polyethylene glycol), polyvalent alcohols (e.g., trimethylolpropane, hexanetriol, glycerine and pentaerythritol) and polyvalent phenols (e.g., hydroquinone and bisphenol A). Examples of the diisocyanate compounds include aromatic diisocyanates (e.g., tolylene diisocyanate, xylylene diisocyanate and 4,4'-diphenylmethane diisocyanate) and aliphatic diisocyanates (e.g., hexamethylene diisocyanate). These polyurethane resins may be terminated with an isocyanate group, hydroxyl group or carboxyl group or mixtures thereof. The polyurethane resins have a molecular weight of from 10,000 to 200,000.

The weight ratio of the nitrocellulose to the polyurethane resin is from 85:15 to 10:90, preferably from 70:30 to 50:50. A binder containing too much nitrocellulose forms a brittle magnetic layer that is not firmly adhered to the non-magnetic base. A binder containing too much polyurethane resin forms a poor dispersion of magnetic particles and hence provides a magnetic layer that has poor surface quality and low S/N ratio.

To provide higher durability, the magnetic layer of this invention may contain a polyisocyanate compound as a curing agent. Examples of the polyisocyanate compound are an adduct of 3 mols of a diisocyanate compound such as tolylene diisocyanate and 1 mol of a trivalent polyol such as trimethylolpropane; a trimer of tolylene diisocyanate; and polyisocyanurate and polyphenylmethane polyisocyanate. An adduct of 3 mols of tolylene diisocyanate and 1 mol of trimethylolpropane is particularly preferred. The weight ratio of the polyisocyanate compound to the sum of the nitrocellulose and polyurethane resin can vary within the range of from 60:40 to 0:100, and a preferred ratio is from 40:60 to 10:90.

The sum of the nitrocellulose and polyurethane resin, or the sum of the nitrocellulose, polyurethane and polyisocyanate is from 10 to 40 wt%, preferably from 20 to 30 wt%, of the ferromagnetic metal particles. If the amount of the binder is too great, the magnetic layer can contain only a small amount of the ferromagnetic metal particles and hence has poor electro-to-magnetic conversion properties. If the amount of the binder is too small, a weak magnetic layer is formed from which the magnetic particles will be dislodged easily.

The ferromagnetic metal particles used in this invention mainly consist of iron-cobalt or iron-nickel-cobalt, and they can be prepared by any of the following non-limiting methods:

(1) an organic acid salt of ferromagnetic metal is hydrolyzed and then reduced with a reducing gas (see Japanese Patent Publication Nos. 11412/61, 22230/61, 14809/63, 3807/64, 8026/65, 8027/65, 15167/65, 12096/66, 24032/67, 3221/68, 22394/68, 29268/68, 4471/69, 27942/69, 38755/71, 4286/72, 38417/72, 41158/72 and 29280/73, Japanese Patent Application (OPI) No. 38523/72 (the term "OPI" as used herein refers to a "published unexamined Japanese patent application"), and U.S. Pat. Nos. 3,186,829 and 3,190,748);

(2) an acicular oxyhydroxide of a ferromagnetic metal, an acicular oxyhydroxide of a ferromagnetic metal and another metal, or acicular iron oxide derived from these oxyhydroxides is reduced (see Japanese Patent Publication Nos. 3862/60, 11520/62, 20335/64, 20939/64, 24833/71, 29706/72, 39477/72, 24952/73 and 7313/74, Japanese Patent Application (OPI) Nos. 7153/71, 38523/72, 79153/73, 82395/73 and 97738/74, and U.S. Pat. Nos. 3,598,568, 3,634,063, 3,607,219, 3,607,220 and 3,702,270);

(3) a ferromagnetic metal is vaporized in a low-pressure inert gas (see Japanese Patent Publication Nos. 25620/71, 4131/74, 27718/72, 15320/74 and 18160/74, and Japanese Patent Application (OPI) Nos. 25662/73, 25663/73, 25664/73, 25665/73, 31166/73, 55400/73 and 81092/73);

(4) a metal carbonyl compound is thermally decomposed (see Japanese Patent Publication Nos. 1004/64, 3415/65, 16968/70 and 26799/74, and U.S. Pat. Nos. 2,983,997, 3,172,776, 3,200,007 and 3,228,882);

(5) particles of a ferromagnetic metal are electrodeposited on a mercury cathode from which the particles are then separated (see Japanese Patent Publication Nos. 12910/60, 3860/61, 5513/61, 787/64, 15525/64 and 8123/65, and U.S. Pat. Nos. 3,262,812, 3,198,717 and 3,156,650); and (6) a metal salt capable of forming a ferromagnetic material in aqueous solution is reduced with a reducing material (e.g., borohydride compound, hypophosphite or hydrazine) to form ferromagnetic particles (see Japanese Patent Publication Nos. 20520/63, 26555/63, 20116/68, 9869/70, 14934/70, 7820/72, 16052/72 and 41718/72, Japanese Patent Application (OPI) Nos. 1363/72, 42252/72, 42253/72, 44194/73, 79754/73 and 82396/73, U.S. Pat. Nos. 3,607,218, 3,756,866, 3,206,338, 3,494,760, 3,535,104, 3,567,525, 3,661,556, 3,663,318, 3,669,643, 3,672,867 and 3,726,664, and Japanese Patent Application Nos. 91498/73, 92720/73, 106901/74 and 134467/74).

The ferromagnetic metal particles prepared by the method (2) wherein an acicular oxyhydroxide or acicular iron oxide is reduced, the method (3) wherein a ferromagnetic metal is vaporized in an inert gas and the method (6) wherein a metal salt is reduced in aqueous solution are particularly preferred because they can be manufactured easily on an industrial scale and have good characteristics. The resulting ferromagnetic metal particles may be provided with an oxide coating to improve their chemical stability.

The ferromagnetic metal particles and the binder are blended with a dispersant, lubricant, abrasive, antistat and a coating solvent to obtain a magnetic paint for application onto the non-magnetic base. The coating solvent is an organic solvent examples of which include ketones such as methyl ethyl ketone and cyclohexanone, alcohols, esters such as ethyl acetate and butyl acetate, cellosolves, ethers, aromatic solvents such as toluene, and chlorinated hydrocarbon solvents such as carbon tetrachloride and chloroform.

Specific examples of dispersants which can be employed in the magnetic recording layer are aliphatic carboxylic acids having 12 to 18 carbon atoms (e.g., of the formula $R_1COOH$, wherein $R_1$ is an alkyl or alkenyl group having 11 to 17 carbon atoms) such as caprylic acid, capric acid, lauric acid, myristic acid, palmitic acid, stearic acid, oleic acid, elaidic acid, linolic acid, linoleic acid, stearolic acid, and the like; metallic soaps comprising alkali metal (Li, Na, K, etc.) or alkaline earth metal (Mg, Ca, Ba, etc.) salts of the above-described aliphatic carboxylic acids; fluorine-containing compounds of the above-described aliphatic carboxylic acid esters; amides of the above-described aliphatic carboxylic acids; polyalkylene oxide alkyl phosphates; lecithin; trialkyl polyolefinoxy quaternary ammonium salts (wherein the alkyl group has 1 to 5 carbon atoms, and the olefin is exemplified by ethylene, propylene, etc.); and the like. In addition, higher alcohols having more than 12 carbon atoms and the sulfuric acid esters thereof and the like can also be employed. These dispersants are employed in an amount of from about 0.5 to about 20 parts by weight per 100 parts by weight of the binder. These dispersants are described in detail in Japanese Patent Publication Nos. 28369/64, 17945/69, 7441/73, 15001/73, 15002/73, 16363/73 and 4121/75, U.S. Pat. Nos. 3,387,993 and 3,470,021, etc.

Typical lubricants include finely divided electrically conductive powders such as graphite, etc.; finely divided inorganic powders such as molybdenum disulfide, tungsten disulfide and the like; finely divided synthetic resin powders such as those of polyethylene, polypropylene, polyethylene-vinyl chloride copolymers, polytetrafluoroethylene and the like; α-olefin polymers; unsaturated aliphatic hydrocarbons which are liquid at normal temperature (compounds in which an n-olefin double bond is positioned at the terminal thereof, with about 5 to about 20 carbon atoms); aliphatic acid esters of aliphatic monocarboxylic acids having 12 to 20 carbon atoms and monovalent alcohols having 3 to 12 carbon atoms, and the like. These lubricants can be employed at about 0.2 to about 20 parts by weight per 100 parts by weight of the binder, and are described in detail in Japanese Patent Publication Nos. 18064/66, 23889/68, 40461/71, 15621/72, 18482/72, 28043/72, 32001/72 and 5042/75, U.S. Pat. Nos. 3,470,021, 3,492,235, 3,497,411, 3,523,086, 3,625,760, 3,630,772 and 3,642,539, *IBM Technical Disclosure Bulletin*, Vol. 9, No. 7, page 779 (December, 1966), *ELEKTRONIK*, 1961, No. 12, page 380, etc.

Specific examples of abrasives are those generally employed which include fused alumina, silicon carbide, chromium dioxide, corundum, artificial corundum, diamond, artificial diamond, garnet, emery (with the main components being corundum and magnetite), and the like. These abrasives have a Mohs' hardness above about 5. Preferably the abrasives employed have an average particle size of about 0.05 to about 5μ, more preferably 0.1 to 2μ. These abrasives are employed in an amount of about 0.5 to about 20 parts by weight per 100 parts of the binder. These abrasives are described in detail in Japanese Patent Publication Nos. 18572/72, 15003/73, 15004/73 (corresponding to U.S. Pat. No. 3,617,378), 39402/74 and 9401/75, U.S. Pat. Nos. 3,007,807, 3,041,196, 3,293,006, 3,630,910 and 3,687,725, British Pat. No. 1,145,349, German Patent Application (DT-PS) Nos. 853,211 and 1,101,000, and the like.

Typical examples of antistats include finely divided electrically conductive powders such as carbon black, carbon black graft polymers and the like; natural surface active agents such as saponin, etc.; nonionic surface active agents such as alkylene oxide type, glycerin type, glycidol type and like surface active agents; cationic surface active agents such as higher alkyl amines, quaternary ammonium salts, pyridines or other heterocyclic compounds, phosphoniums or sulfoniums and the like; anionic surface active agents containing an acidic group derived from a carboxylic acid group, a sulfonic acid group or a phosphoric acid group, a sulfuric acid ester group, a phosphoric acid ester group and the like; amphoteric surface active agents such as sulfuric acid esters or phosphoric acid esters, etc., of amino acids, aminosulfonic acids, amino alcohols and the like.

The above-described finely divided electrically conductive powders can be employed in an amount of about 0.2 to about 20 parts by weight per 100 parts of the binder, and the surface active agents can be used in an amount of from about 0.1 to about 10 parts by weight per 100 parts by weight of the binder.

These electrically conductive finely divided powders which can be employed as antistats and some surface active agents are described in Japanese Patent Publication Nos. 22726/71, 24881/72, 26882/72, 15440/73 and 26761/73, U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174 and 3,545,974, German Patent Application (OLS) No. 1,942,665, British Pat. Nos. 1,077,317 and 1,198,450, etc., and in references such as Rhohei Oda, et al., *Kaimen Kasseizai no Gosei to sono Oyo (Synthesis and Application of Surface Active Agents)*, published by Maki Shoten, Tokyo (1964), A. M. Schwartz and J. W. Perry, *Surface Active Agents*, published by Interscience Publications Inc. (1958), J. P. Sisley, *Encyclopedia of Surface Active Agents*, Vol. 2, published by Chemical Publishing Co. (1964), *Kaimen Kasseizai Binran (Handbook of Surface Active Agents)*, Sixth Ed., published by Sangyo Tosho Kabushiki Kaisha, Japan (Dec. 20, 1966), etc.

The non-magnetic base may be made of a synthetic resin (e.g., polyester, polyamide, polyolefin, cellulose derivative), non-magnetic metal, glass, ceramics and paper. The base is used in the form of a film, tape, sheet, card, disc, drum or any other suitable form, but it is generally used in the form of a tape or sheet.

The magnetic paint is prepared by charging a mixer with the magnetic particles and all other ingredients simultaneously or sequentially. Various mixers may be used to achieve thorough mixing of the ingredients. For details of the mixers, see T. C. Patton, *Paint Flow and Pigment Dispersion*, John Wiley & Sons, 1964. A magnetic layer is formed from the magnetic paint on the base by various methods that are specifically described in *Coating Kogaku (Coating Engineering)*, published by Asakura Shoten, 1971. The magnetic layer thus formed on the base is dried after the magnetic particles in the layer are optionally oriented. The magnetic layer may be passed through a smoothing step for improving its magnetic properties (e.g., smoothing before drying or calendering after drying).

This invention is now described in greater detail by reference to the following examples which are given here for illustrative purposes only and are by no means intended to limit the scope of the invention. In the examples, all parts are by weight.

EXAMPLE 1

Acicular particles of α-FeOOH containing 5 wt% cobalt were decomposed with heat to produce α-$Fe_2O_3$ particles which were reduced with hydrogen to form ferromagnetic metal particles. The particles had a coercive force (Hc) of 1,400 Oe, a saturation magnetization ($\sigma$s) of 150 emu/g and a squareness ratio ($\sigma$s/$\sigma$r) of 0.52.

Three hundred parts of the ferromagnetic metal particles and a composition having the following formulation were placed in a ball mill where they were mixed thoroughly for 48 hours.

| | parts |
|---|---|
| Nitrocellulose (RS ½) | 30 |
| Polyester polyurethane (reaction product of ethylene adipate and 2,4-tolynene diisocyanate, wt. av. m.w. for polyester: ca. 110,000) | 20 |
| Palmitic acid | 5 |
| Butyl stearate | 2 |
| Aluminum oxide (α-$Al_2O_3$) | 6 |
| Butyl acetate | 500 |
| Methyl isobutyl ketone | 400 |

The resulting coating solution was applied to one surface of a polyethylene terephthalate film, placed in a magnetic field for orientation, dried, calendered and slit to form a magnetic video tape ½ inch wide.

EXAMPLE 2

An intimate mixture of ferromagnetic metal particles and a binder as prepared in the same manner as in Example 1 was further mixed with 25 parts of a 75 wt% ethyl acetate solution of a triisocyanate compound ("Desmodule L-75" of Bayer A. G.) and the resulting mixture was stirred with a high-speed disperser for 1 hour to provide a magnetic coating solution. The solution was applied to one surface of a polyethylene terephthalate film which was subsequently treated as in Example 1 to provide a magnetic tape.

COMPARATIVE EXAMPLES 1 AND 2

Magnetic tapes were produced as in Examples 1 and 2 except that the nitrocellulose was replaced by a maleic acid-containing vinyl chloride/vinyl acetate copolymer commonly used in iron oxide coated tapes.

The squareness ratio, electro-to-magnetic conversion characteristics, still mode durability, stability to repeated running, friction coefficient and time-dependent change in magnetic properties under exposure to a hot and humid atmosphere of the four tapes are indicated in Table 1.

TABLE 1

| | Squareness Ratio (1) | Electro-to Magnetic Conversion Properties (2) (output at 4 MHz) | Still Mode Durability (3) | Stability to Repeated Running (4) | Friction Coefficient (5) | Time-Dependent Change in Magnetic Properties (6) (percent demagnetization) |
|---|---|---|---|---|---|---|
| Example 1 | 0.85 | 9.0 dB | 90 Minutes or more | 100 Passes or more | 0.35 | −7.0% |
| Example 2 | 0.85 | 8.7 dB | 90 Minutes or more | 100 Passes or more | 0.31 | −5.0% |
| Comparative Example 1 | 0.84 | 8.0 dB | 30 Minutes | 30–40 Passes | 0.40 | −6.0% |
| Comparative Example 2 | 0.84 | 7.8 dB | 90 Minutes or more | 100 Passes or more | 0.36 | −5.0% |

(1) The B/mBr value as measured by a vibrating flux meter (Model VSM-III of Toei Kogyo K.K.)
(2) The reproduction output as measured at a 4 MHz by a VHS video tape recorder (Model NV-8800 of Matsushita Electric Industrial Co., Ltd.) whose record/reproduce head was especially made of "Sendust" (alloy). As a reference tape, Fuji Video Cassette T-120E of Fuji Photo Film Co., Ltd. was used.
(3) In a still mode, the rotary video head of the VTR of (2) was rotated in contact with the same area of a standing tape. The time for the output reproduced from the recorded signal by the video head to be reduced to substantially zero as a result of tape abrasion was measured.
(4) A given length of tape (e.g., 10 m) was threaded in a VHS cassette half, and a predetermined signal was recorded on the tape and repeatedly reproduced with a VHS video tape recorder, and the resulting tape damage was checked.
(5) The friction coefficient as measured at 25° C. and 65% RH when the tape was caused to run in contact with a stainless steel pole (surface roughness: 0.15μ, diameter: 5 mm) at an angle of 180° and at a speed of 3.3 cm/sec under a load of 50 g.
(6) The percent reduction of the saturation flux density (Bm) of the tape exposed to a 60° C., 90% RH atmosphere for 10 days.

As is clear from Table 1, the tapes of Examples 1 and 2 had a squareness ratio, video output and percent demagnetization equal to or even superior to those of the tapes of Comparative Examples 1 and 2, which indicates that the former was as good as the latter with respect to the dispersibility of magnetic particles, electro-to-magnetic conversion properties and long-term stability. As for the durability and running property, the tape of Example 1 withstood the operation in a still mode at least three times as long as the tape of Comparative Example 1 and the same had better running property than the tape of Comparative Example 1, which indicates that the binder containing nitrocellulose had higher durability and better running property than the binder containing no nitrocellulose. The table also shows that the binder containing nitrocellulose exhibited a friction coefficient 0.03 to 0.04 less than that produced by the binder containing the vinyl chloride/vinyl acetate copolymer, and this demonstrates that the nitrocellulose is better than the vinyl chloride/vinyl acetate copolymer with respect to tape running property. The tape of Example 2 had a friction coefficient as much as 0.04 lower than that of Example 1, and this indicates that curing with an isocyanate compound produced even better running property. These results show that the nitrocellulose is a better binder component than the vinyl chloride/vinyl acetate copolymer in that it achieves higher durability and better running property without impairing the magnetic properties and electro-to-magnetic conversion properties. It can also be seen that a magnetic recording medium using a binder containing the nitrocellulose has better characteristics than that using a binder containing the vinyl chloride/vinyl acetate copolymer.

While the invention has been described in detail and with reference to specific embodiments thereof, it will be apparent to one skilled in the art that various changes and modifications can be made therein without departing from the spirit and scope thereof.

What is claimed is:

1. A magnetic recording medium, comprising:
 a non-magnetic support base; and
 a magnetic layer overlaid on a surface of said non-magnetic support base, said magnetic layer comprising ferromagnetic particles and a binder, said ferromagnetic particles being metal particles and said binder consisting essentially of (a) a nitrocellulose and (b) a polyurethane resin, wherein said nitrocellulose is selected from the group consisting of SS type nitrocellulose with a nitrogen content of 10.7–11.5% and RS type nitrocellulose with a nitrogen content of 11.5–12.2%.

2. A magnetic recording medium as claimed in claim 1, wherein said polyurethane resin has a molecular weight of from 10,000 to 200,000.

3. A magnetic recording medium as claimed in claim 1, wherein the weight ratio of said nitrocellulose to said polyurethane resin is from 85:15 to 10:90.

4. A magnetic recording medium as claimed in claim 3, wherein said ratio of said nitrocellulose to said polyurethane resin is from 70:30 to 50:50.

5. A magnetic recording medium as claimed in claim 1, further comprising:
 a polyisocyanate compound as a curing agent.

6. A magnetic recording medium as claimed in claim 5, wherein the weight ratio of said polyisocyanate compound curing agent to the sum of said nitrocellulose and polyurethane resin is within the range of 60:40 to 0:100.

7. A magnetic recording medium as claimed in claim 6, wherein said ratio of said polyisocyanate compound to said sum of said nitrocellulose and polyurethane resin is within the range of 40:60 to 10:90.

8. A magnetic recording medium as claimed in claim 1, wherein the sum of said nitrocellulose and polyurethane resin is from 10 to 40 weight % of the ferromagnetic particles.

9. A magnetic recording medium as claimed in claim 8, wherein said sum of said nitrocellulose and polyurethane resin is from 20 to 30 weight % of said ferromagnetic particles.

10. A magnetic recording medium as claimed in claim 5, wherein the sum of nitrocellulose, polyurethane and polyisocyanate is from 10 to 40 weight % of the ferromagnetic particles.

11. A magnetic recording medium as claimed in claim 10, wherein said sum of said nitrocellulose, polyurethane and polyisocyanate is from 20 to 30 weight % of the ferromagnetic particles.

* * * * *